United States Patent [19]

Gras et al.

[11] 4,215,165

[45] Jul. 29, 1980

[54] METHOD FOR COATING OF GLASS SURFACES

[75] Inventors: Rainer Gras; Horst Schnurbusch, both of Herne, Fed. Rep. of Germany

[73] Assignee: Chemische Werke Huls Aktiengesellschaft, Marl, Fed. Rep. of Germany

[21] Appl. No.: 925,171

[22] Filed: Jul. 17, 1978

[51] Int. Cl.$^2$ .................. B65D 23/08; B65D 11/16
[52] U.S. Cl. .................. 428/35; 215/12 R; 215/DIG. 6; 427/299; 427/379; 427/387; 427/421; 428/429; 427/389.7; 427/407.2; 427/430.1
[58] Field of Search .................. 427/379, 385 A, 387, 427/299, 407 A, 421, 430 R; 428/35, 429; 215/DIG. 6, 12 R; 427/299, 407 A

[56] References Cited

U.S. PATENT DOCUMENTS

| | | | |
|---|---|---|---|
| 3,779,794 | 12/1973 | DeSantis | 428/429 X |
| 4,015,044 | 3/1977 | Ranney et al. | 428/429 X |
| 4,021,405 | 5/1977 | Tucker et al. | 428/429 X |
| 4,053,076 | 10/1977 | Vogel et al. | 215/12 R |
| 4,056,208 | 11/1977 | Prejean | 428/429 X |
| 4,118,540 | 10/1978 | Amort et al. | 428/429 X |

FOREIGN PATENT DOCUMENTS

| | | | |
|---|---|---|---|
| 4860586 | 5/1975 | Japan | 428/429 |
| 711374 | 6/1954 | United Kingdom | 428/429 |

*Primary Examiner*—John D. Smith
*Assistant Examiner*—Thurman K. Page
*Attorney, Agent, or Firm*—Oblon, Fisher, Spivak, McClelland & Maier

[57] ABSTRACT

A method for the coating and protection of a glass surface which comprises:
  treating the glass surface with an aqueous or an alcoholic solution of a silane in order to provide a skim coat thereon, drying the resulting silane-coated surface, coating the dried silane-coated surface with a paste comprising (1) an aliphatic or cycloaliphatic diisocyanate, a mixture thereof, or a reaction product thereof with water, wherein the mole ratio of said diisocyanate to water is 2:≤1 and (2) a hydroxy-group containing polyester derived from a ω-hydroxy carboxylic acid or a lactone therefrom and a triol, wherein said acid or lactone contains at least 4 carbon atoms, and hardening the paste. Glass bottles coated by this a method are also described in this invention.

19 Claims, No Drawings

METHOD FOR COATING OF GLASS SURFACES

BACKGROUND OF THE INVENTION

1. Field of the Invention

The present invention relates to a method of coating and protecting glass surfaces, especially glass bottles and to the bottles derived therefrom.

2. Description of the Prior Art

The coating of glass surfaces, especially glass bottles, with a strongly adhering, homogeneous and transparent synthetic coat, bestows upon these bottles an extraordinary safety upon their filling with carbonic acid-containing beverages, such as beer, Coca-Cola, mineral water, fruit juices etc., as well as prolonging the durability of multi-way bottles. Upon the influence of strikes and impacts, and also upon heating under the sun or by other heat sources, unprotected bottles have readily exploded in the past, resulting as a consequence in various severe bodily injuries, especially eye injuries on humans.

Some of the previously known coatings used for these purposes have the disadvantage, that the coating overlay becomes turbid after repeated cleanings, which effect can be attributed in thermoplastic materials possibly to a post-crystallization effect of the synthetic material. Such bottles convey a negative impression optically and are therefore psychologically undesirable from the view point of marketing. The disadvantage of duroplastic, ether group-containing synthetic coatings lies in their susceptibility to oxidation, which leads to embrittlement of the overlay coat and therefore, especially in the case of multi-way bottles to a loss of the ability to protect against splintering.

SUMMARY OF THE INVENTION

These problems have now been solved by finding that glass surfaces, especially glass bottles, can be coated without these and other disadvantages, when one employs a method for the coating, and for the prevention of scattering of glass particles upon bursting, whereby a transparent, duroplastic protective coat of more than 50 microns is formed by depositing a paste of polyisocyanates and hydroxy group-containing compounds as well as usual processing additives and hardening the overcoat at higher temperatures, wherein the clean glass surface is first treated with an aqueous or alcoholic silane skim coat, is dried and thereafter the so treated glass surface is coated with a paste of aliphatic and/or cycloaliphatic diisocyanates or their reaction products with water in a mole ratio of $2:\leqslant 1$ and a trifunctional, hydroxy group-containing polyester of an average molecular weight of 300–1400, preferably 500–800, derived from $\omega$-hydroxycarboxylic acids or their lactones, with at least 4 C-atoms.

DESCRIPTION OF THE PREFERRED EMBODIMENTS

According to another embodiment, it is possible to replace up to 90% by weight of the trifunctional, hydroxy group-containing polyester by a bifunctional polyester of the same structure of an average molecular weight of 400–2000, preferably 500–1200.

The synthetic protective coat applied according to this method is highly elastic and shows an extraordinary adherence, so that upon breaking of the glass or bursting of the bottles, the glass splinters remain inside of the protective coat. The bottle shape remains fully preserved after destruction of the glass bottle. The appearing kinetic energy is transformed through the stretching and heating of the synthetic coating.

A special advantage of the coating is its resistance against hot, alkali-containing wash lyes, with which the bottles are cleaned prior to their filling with beverage. This is particularly relevant to multi-way bottles which are subject to an intensive cleaning prior to each filling operation.

The advantage of the coatings of the present invention lies in that even after repeated washing in hot, alkaline washing lye, they undergo no loss of mechanical properties and no loss in adherence. The glass bottles coated with the synthetic coating material of the present invention can be used without further precautions as containers for carbonic acid-containing beverages, since there is no danger to humans upon their breaking or exploding.

The lifetime of a coated bottle when used as a multi-way bottle is longer than that of an uncoated bottle, which on account of the rubbing against sharp edges which occurs during the movement and on account of the washing operations in hot solutions, are strongly worn on the surface and can be damaged.

According to the present method, a clean glass surface, such as for example a glass bottle, is first treated with an aqueous or alcoholic silane skim coat. For this treatment, silanes are used which contain radicals with two different correlated functional groups. One of these groups is a lower alkoxy radical, preferably methoxy- and ethoxy radical, which is capable of reacting with the OH-groups of the glass surface and the other group is an organic radical with such functional groups as are capable of reacting with isocyanate groups; such as amino-, epoxy-, mecapto groups etc.; as for example, $\gamma$-aminopropyl-trimethoxy silane, glycidyloxypropyl-triethoxy silane, $\gamma$-mecaptopropyl trimethoxy silane. $\gamma$-mecaptopropyl-triethoxy silane etc. The treatment of the glass surface can for example be done by immersion in or by spraying with the skimming coat medium. The so obtained bottles can either be separately dried at 25°–100° C. or the drying is carried out through the heating of the glass bottle to 80° C.–100° C.; that is, at a temperature which occurs during the cooling processes in bottle manufacture.

The application of the solvent-free PUR two-component coating pastes on the thus pretreated prewarmed glass bottles described below, is carried out according to known methods, such as pouring, spraying, immersing, and others.

The application of heat can be continued after the application of the coating materials until the reaction is completed, when the available heat capacity is not sufficient to cause hardening.

The thus coated glass bottle is then subjected to hardening at a temperature in the range of from 150°–240° C., preferably 180°–210° C.

For the preparation of the coating, it is possible to use for example aliphatic and/or cycloaliphatic diisocyanates, such as those given as an example in the article by W. Siefken in Justus Leibigs Annalen der Chemie 562, pages 75–136, such as ethylene diisocyanate-1,2; tetramethylene diisocyanate-1,4; hexamethylene diisocyanate-1,6; 2,2,4-and 2,4,4-trimethyl-hexamethylene diisocyanate-1,6 (TMDI); dodecanediisocyanate-1,12; $\omega,\omega'$diisocyanato-dipropyl ether; lysine diisocyanate; cyclobutane-1,3diisocyanate; cyclohexane-1,3 and 1,4- diisocyanate; 3-isocyanatomethyl-3,5,5-trimethylcyclohexylisocyanate, which is also known as isophorondiisocyanate and abbreviated as IPDI; decahydro-8-methyl (1,4-methanonaphthalene-2 (or 3) 5-ylen-dimethylene- diisocyanate; decahydro-4,7-methano-indane-1 (or 2) 5 (or 6) ylendimethylene- diisocyanate, hexahydro-4,7-methane-indane-1 (or 2) 5 (or 6) ylen-dimethylene-diisocyanate; hexahydrotoluylene-diisocyanate; perhydro-2,4'- and/or-4,4'-diphenylmethane-diisocyanate, as well as appropriate mixtures of the isomers. Further appropriate isocyanates are mentioned in the article referred to in the Annalen, at page 122 and following. Obviously it is also possible to use mixtures of the isocyanates. It is further possible to use reaction products of these diisocyanates with water in a mole ratio of 2:≤1, preferably those described in the DT-OS No. 23 41 065.

The reaction of the polyester with the diisocyanate is carried out in such amounts that 1 OH-group reacts with 0.8–1.2, preferably 0.95–1.1 isocyanate groups.

For the preparation of the solvent free PUR-two component coatings it is possible to use preferably trifunctional, hydroxy-containing polyesters derived from ω-hydroxy carboxylic acids or lactones thereof, wherein it is understood that under trifunctional polyesters are those which contain 3 OH-groups. The molecular weights of the polyesters has to be in the described range. The hydroxy carboxylic acids or lactones thereof have at least 4 C-atoms in their chain. As an upper limit it is possible to use those that contain 7 C-atoms. Typical examples for appropriate lactones are γ-butyrolactone, δ-valerolactone, Γ-caprolactone, methyl-ε-caprolactone, and others.

The preparation of these lactone polyester polyles can be carried out in a known fashion according to the U.S. Pat. Nos. 2,890,208, 2,977,885, or 2,933,478, wherein lactones are treated with triols as initiators while heating with or without catalyst. Appropriate triols are for example glycerine, trimethylolpropane, trimethylolethane, triethanolamine, and others. Instead of the lactones, it is also possible to prepare the hydroxy group-containing polyesters of the present invention from the corresponding ω-hydroxy carboxylic acids and triols according to known methodology.

According to the present invention it is possible to replace up to 90% by weight of the trifunctional polyesters with bifunctional ones, that is those with 2 OH-groups. These can be prepared also according to the methods described in the above mentioned U.S. patents. As initiators it is possible to use in this case, diols such as ethylene glycol, propylene glycol-1,2 and -1,3; butane diol-1,4 and -1,3; hexane diol-1,6; diethylene glycol, triethylene glycol, and others.

According to the present invention mixtures of the tri- and bifunctional, hydroxy group-containing polyesters were also investigated, wherein the mixture composition is between 90:10 and 10:90, preferably 80:20 to 40:60. These values are weight percents.

The mechanical data described in the examples for PUR-glass coatings were determined by the following methods:

Tensile strength  
Elongation } according to German Industrial Standards 53 455  
π100-tension Additionally, test films were subjected to the following stability tests:
Lye Wash Test:4% by weight NaOH, 0.4% by weight Na-glyconate, 1 cycle: 30 minutes/80° C.
Tropical Test: 70° C./100% relative current humidity
Sterilization: 121° C./2 hours Further, the adhesion and protection against splintering were tested. The protection against splintering was determined in a so called drop test. For this purpose, 6.3 g $H_2SO_4$ (98% by weight) and 9 g $NaHCO_3$ were introduced into a coated 0.7 liter beverage bottle and the bottle was sealed. The amount of resulting $CO_2$ produces at 25° C., an internal pressure of about 4.0 atmospheres. The thus prepared test bottle was allowed to drop from a height of 1.2 , monto a concrete plate and the scattering of the glass splinters was observed.

Having generally described this invention, a further understanding can be obtained by reference to certain specific examples which are provided herein for purposes of illustration only and are not intended to be limited unless otherwise specified.

DESCRIPTION OF THE STARTING MATERIALS USED IN THE EXAMPLES

1. Component A: (Hydroxy group-containing polyester)

As multi-valent, hydroxy group-containing polyesters, were used the polycaprolactones manufactured by Union Carbide Corporation. The difunctional types were on the basis of diethylene glycol and ε-caprolactone.

Polyester $A_1$: With a hydroxyl count of 212 mg KOH/g; an acid count of 0.3 mg KOH/g and an average molecular weight of 530.

Polyester $A_2$: With a hydroxy count of 135 mg KOH/g; an acid count of 0.3 mg KOH/g and an average molecular weight of 830

The trifunctional types were on the basis of 1,1,1-trimethylolpropane and ε-caprolactone.

Polyester $A_3$: With a hydroxy count of 310 mg KOH/g; with an acid count of 0.3 mg KOH/g and an average molecular weight of 540

The average molecular weights of these polyesters were averaged from the determined hydroxy counts.

2. Component B: (Diisocyanates)

Besides of the monomeric isophorondiisocyanate (Hardener $B_1$) were also used two resin adducts dissolved in isophorondiisocyanate, according to the DT-OS No. 23 41 065 prepared from IPDI and water, that is to say the IPDI-Adduct $B_2$: with a NCO-content of 28.7% by weight, an equivalent weight of 146.3 and a viscosity of 25° of 8100 cP IPDI-Adduct $B_3$: with an NCO-content of 31.5% by weight, an equivalent weight of 133.3 and a viscosity of 25° C. of 450 cP.

3. Coating Pastes

In each of the following examples, the component A, made up of the tri- and/or bifunctional polyesters, catalyst and blending medium was homogenized at 40°–50° C. in a dissolver and evacuated so long as necessary until no more bubbles evolved. Thereafter, component B-the hardener- was added, mixed and again evacuated until the disappearance of bubbles. The coating material was then applied onto untreated prewarmed glass plates at 80°–100° C., in order to prepare films for the determination of the mechanical properties and for the stability tests such as the lye wash test and the tropical test, as well as the sterilization. For adhesion experiments and drop tests, silane skim coat pretreated glass plates and glass bottles, were preheated at 80°–100° C. and then coated.

Table 1 shows examples of the mechanical properties of polyol combinations in composition with IPDI, IPDI-Adduct $B_2$ and $B_3$. The OH/NOC-ratio was 1:1.

when the elongation was greater than 150% but the tensile strength was somewhat less than 28 N/mm$^2$.

Table 2 shows a few examples of the mechanical properties of other polyester combinations in composition with IPDI, IPDI-Adduct $B_2$ and $b_3$. The OH/NCO-ratio was 1:1. The hardening followed at 200° C. within a period of 15 minutes.

TABLE 2

| Examples | 12 | 13 | 14 | 15 | 16 | 17 | 18 | 19 | 20 | 21 | 22 |
|---|---|---|---|---|---|---|---|---|---|---|---|
| Component A | | | | | | | | | | | |
| Polyester $A_3$ | 506.4 | 453.87 | 471.94 | 448.6 | 402.99 | 418.48 | 389.48 | 350.6 | 364.68 | 328.63 | 307.68 |
| Polyester $A_1$ | 126.6 | 113.46 | 117.99 | 192.3 | 172.71 | 179.35 | 259.58 | 233.73 | 243.12 | 328.63 | 307.68 |
| Sn-octanoate | 2.0 | 2.0 | 2.0 | 2.0 | 2.0 | 2.0 | 2.0 | 2.0 | 2.0 | 2.0 | 2.0 |
|  | 1.0 | 1.0 | 1.0 | 1.0 | 1.0 | 1.0 | 1.0 | 1.0 | 1.0 | 1.0 | 1.0 |
| Component B | | | | | | | | | | | |
| IPDI | 364 | | | 356.1 | | | 348.04 | | | 339.74 | |
| IPDI-Adduct $B_2$ | | 429.67 | | | 421.3 | | | 412.67 | | | |
| IPDI-Adduct $B_2$ | | | 407.07 | | | 399.17 | | | 391.1 | | 381.64 |
| Mechanical Properties | | | | | | | | | | | |
| Tensile Strength N/mm$^2$ | 35.0 | 42.5 | 42.0 | 31.5 | 40.5 | 39.0 | 25.5 | 36.0 | 35.0 | 22 | 24.5 |
| Elongation | 170 | 85 | 120 | 190 | 120 | 160 | 220 | 150 | 180 | 240 | 215 |

The hardening followed after a 15 minute heating at 200° C.

The results of the stability tests—lye wash, tropical test, sterilization—are summarized in Table 3. Teh adhesion

TABLE 1

| Examples | 1 | 2 | 3 | 4 | 5 | 6 | 7 | 8 | 9 | 10 | 11 |
|---|---|---|---|---|---|---|---|---|---|---|---|
| Component A | | | | | | | | | | | |
| Polyester $A_3$ | 516.38 | 464.49 | 482.39 | 462.2 | 417.5 | 433.81 | 405.48 | 367.93 | 381.68 | 346.03 | 326.1 |
| Polyester $A_2$ | 129.09 | 116.12 | 120.60 | 198.1 | 178.9 | 185.92 | 270.32 | 245.28 | 254.46 | 346.03 | 326.1 |
| Sn-Octanoate | 2.0 | 2.0 | 2.0 | 2.0 | 2.0 | 2.0 | 2.0 | 2.0 | 2.0 | 2.0 | 2.0 |
| Commercial flowing agents on the basis of alkyl esters of perfluorinated carboxylic acids. | 1.0 | 1.0 | 1.0 | 1.0 | 1.0 | 1.0 | 1.0 | 1.0 | 1.0 | 1.0 | 1.0 |
| Component B | | | | | | | | | | | |
| IPDI-$B_1$ | 351.53 | | | 336.7 | | | 321.2 | | | 304.94 | |
| IPDI-Adduct $B_2$ | | 416.39 | | | 400.6 | | | 383.79 | | | |
| IPDI-Adduct $B_3$ | | | 394.01 | | | 379.17 | | | 362.76 | 344.8 | |
| Mechanical Properties | | | | | | | | | | | |
| Tensile Strength N/mm$^2$ | 32.0 | 39 | 38 | 30.5 | 36.0 | 35 | 24 | 32 | 28 | 18.5 | 19.5 |
| Elongation % | 190 | 100 | 140 | 210 | 140 | 170 | 260 | 180 | 200 | 270 | 230 |

The results of the stability tests—lye wash, topical test, sterilization—are summarized in Table 3. The adhesion of the coating masses onto pretreated glass bottles and glass plates (even after five cycles of the lye wash test) was excellent. The protection against splintering was assured in the recipes having an elongation of larger than about 150%. The smaller the elongation of the films (see also comparative examples), the smaller also the protection against splintering; that is, the splinters of the burst glass bottles can be found in a circle of more than two meters. The same observation was made, of the coating masses on pretreated glass bottles and plates (also after five cycles of lye wash test) was excellent. The protection against splintering was assured in the recipes having an elongation of more than about 150%. The smaller the elongation of the film (see also comparative examples), the smaller is the protection against splintering; that is, the splinters of the bursting glass bottles can be found in a circle of larger than 2 m. The same observation was made when the elongation was greater than 150%, but the tensile strength was somewhat smaller than 28 N/mm$^2$.

Table 3 shows the lye wash, tropical and sterilization resistance of selected examples from Tables 1 and 2.

TABLE 3

| Example | | 1 | 4 | 6 | 8 | 12 | 15 | 17 | 20 |
|---|---|---|---|---|---|---|---|---|---|
| Lye Wash Test | | | | | | | | | |
| Tensile Strength $\sigma B$ | N/mm$^2$ | 31.5 | 30 | 34.5 | 31.0 | 35 | 32.5 | 38.5 | 34.0 |
| Elongation $\epsilon B$ | % | 185 | 205 | 170 | 185 | 180 | 190 | 165 | 185 |
| $\sigma$100-Tension $\sigma$100 | N/mm$^2$ | 14.5 | 14 | 16 | 15.5 | 16 | 14.5 | 19 | 15.0 |
| $\sigma B$ after 5 cycles and after 24 h at RT | N/mm$^2$ | 24 | 24.5 | 26 | 25 | 27 | 21.5 | 26 | 26 |
|  |  | 26 | 26 | 27 | 26.5 | 28 | 24 | 29 | 26.5 |
| $\epsilon B$ after 5 cycles and after 24 h at RT | % | 190 | 215 | 185 | 190 | 195 | 200 | 170 | 190 |
|  |  | 150 | 170 | 135 | 155 | 160 | 150 | 135 | 140 |
| $\sigma$100 after 5 cycles and after 24 h at RT | N/mm$^2$ | 5.5 | 5 | 6.5 | 5.5 | 6.5 | 5.0 | 7.5 | 6.0 |
|  |  | 15.0 | 14.5 | 15.0 | 14.5 | 15.5 | 14.0 | 19 | 14 |

TABLE 3-continued

| Tropical Test | | | | | | | | | | |
|---|---|---|---|---|---|---|---|---|---|---|
| Tensile Strength σB | | N/mm² | 33 | 31.5 | 35.5 | 33 | 34 | 34 | 37 | 35.5 |
| Elongation εB | | % | 180 | 195 | 165 | 180 | 185 | 180 | 170 | 170 |
| σ100-Tension σ100 | | N/mm² | 15.5 | 16 | 16.5 | 15 | 14 | 13.5 | 17.5 | 15.5 |
| After | σB after 1 day + 24h at RT | N/mm² | 30 | 28.5 | 32.5 | 31.5 | 32 | 31.5 | 33.5 | 32.5 |
| the | εB after 1 day +24h at RT | % | 190 | 210 | 180 | 190 | 195 | 200 | 180 | 190 |
| Test | σ100 after 1 day + 24h at RT | N/mm² | 15 | 14.5 | 16 | 14 | 14 | 13.5 | 16.5 | 14 |
| | σB after 7 days + 24h at RT | N/mm² | 29 | 27.0 | 30.5 | 29 | 29.5 | 29 | 29 | 27.5 |
| | εB after 7 days + 24h at RT | % | 180 | 190 | 155 | 170 | 165 | 175 | 170 | 175 |
| | σ100 after 7 days + 24h at RT | N/mm² | 14 | 13 | 17 | 15 | 15.5 | 14.5 | 17 | 14.5 |
| | σB after 14 days + 24h at RT | N/mm² | 24.5 | 25 | 27.5 | 26 | 27 | 25.5 | 27 | 26 |
| | εB after 14 days + 24h at RT | % | 140 | 155 | 130 | 155 | 130 | 140 | 135 | 140 |
| | σ100 after 14 days + 24h at RT | N/mm² | 18 | 17.0 | 19.5 | 18 | 19 | 18.5 | 18 | 17.5 |
| Sterilization | | % | 1.7 | 1.8 | 1.6 | 1.9 | 1.8 | 1.8 | 1.9 | 1.8 |

COMPARATIVE EXAMPLE 1

Component A
  384.87 Parts by weight of Polyetherpolyol on the basis of ethylene oxide (OH-Count: 108 mg KOH/g) linear
  102.68 Parts by weight of Polyetherpolyol on the basis of ethylene oxide (OH-Count: 258 mg KOH/g) linear
  102.0 Parts by weight of Trimethylolpropane
  2.0 Parts by weight of Sn-octanoate
  1.0 Parts by weight of blending additive analogous to Examples 1–22
Component B
  407.45 Parts by weight of IPDI
Mechanical Properties
  Tensile Strength:18.0N/mm²
  Elongation:10%
No protection against splintering is guaranteed.

COMPARATIVE EXAMPLE 2

Component A
  225.12 Parts by weight of Polytetramethylene glycolether (OH-Count; 173.5 mg KOH/g)
  262.43 Parts by weight of Polytetramethylene glycolether (OH-Count: 110.5 mg KOH/g)
  102.0 Parts by weight of Trimethylolpropane
  2.0 Parts by weight Sn-octanoate
  1.0 Parts by weight blending additive analogous to Comparative Example 1
Component B
  407.45 Parts by weight of IPDI
Mechanical Properties
  Tensile Strength:35.0 N/mm²
  Elongation:160%
In the drop test, negligible scattering of glass splinters was observed.

In addition, the films showed after the hardening process, a distinct yellowish coloration. After 400 hours with a short weathering in the xenotest, embrittlement appeared, and after 650 hours, the film was totally destroyed.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A method for the coating and protection of a glass surface which comprises:
   treating said glass surface with an aqueous or an alcoholic solution of a silane reagent in order to provide a skim coat thereon;
   drying the resulting silane-coated surface;
   coating the dried silane-coated surface with a paste comprising (1) an aliphatic or cycloaliphatic diisocyanate, a mixture thereof, or a reaction product thereof with water, wherein the mole ratio of said diisocyanate to water is 2:≤1 ;1 and (2) a hydroxy-group containing polyester, derived from a ω-hydroxy carboxylic acid or a lactone therefrom, with a triol; wherein said acid or lactone contains at least 4 carbon atoms; and
   hardening said paste.

2. The method of claim 1 wherein said glass surface is a glass bottle.

3. The method of claim 1 wherein, the average molecular weight of said polyester is 300–1400.

4. The method of claim 3 wherein said polyester has an average molecular weight of 500–800.

5. The method of claim 1 wherein said hydroxy-group containing polyester is a mixture containing 10–90% of a diol-derived polyester with an average molecular weight of 400–2000 and 90–10% of a triol-derived polyester with an average molecular weight of 300–1400.

6. The method of claim 5 wherein said diol-derived polyester has an average molecular weight of 500–1200.

7. The method of claim 1 wherein said hydroxy-containing polyester and said diisocyanate are reacted in such amounts that 0.8–1.2 isocyanate groups react with one OH group.

8. The method of claim 7 wherein one OH group reacts with 0.95–1.1 isocyanate groups.

9. The method of claim 1 wherein said silane contains radicals with two different correlated functional groups, wherein one of said groups is capable of reacting with said glass surface and the other group is capable of reacting with isocyanate groups.

10. The method of claim 9 wherein said group reactive with said glass surface is a lower alkoxy group.

11. The method of claim 10 wherein said lower alkoxy group is methoxy or ethoxy.

12. The method of claim 9 wherein said group reactive with said isocyanate is selected from the group consisting of amino, epoxy and mecapto groups.

13. The method of claim 1 wherein said drying is carried out at 25–100° C.

14. The method of claim 1 wherein said triol is selected from the group consisting of glycerine, trimethylolpropane, trimethylolethane and triethanolamine.

15. The method of claim 5 wherein said diol is selected from the group consisting of ethylene glycol, 1,2-propylene glycol, 1,3-propylene glycol, 1,4-butane diol, 1,3-butane diol, 1,6-hexane diol, diethylene glycol and triethylene glycol.

16. The method of claim 1 wherein said lactones are selected from the group consisting of γ-butyrolactone, δ-valerolactone, ε-caprolactone, and methyl-ε-caprolactone.

17. The method of claim 1 wherein said paste is hardened at a temperature in the range 150°–240° C.

18. The method of claim 17 wherein said temperature is in the range 180°–210° C.

19. The coated glass bottles of claim 11.